(12) United States Patent
Bazor et al.

(10) Patent No.: US 10,928,905 B2
(45) Date of Patent: Feb. 23, 2021

(54) BODY MOTION AND POSITION SENSING, RECOGNITION AND ANALYTICS FROM AN ARRAY OF WEARABLE PRESSURE SENSORS

(71) Applicants: TACSENSE, INC., Woodland, CA (US); THE REGENTS OF THE UNIVERSITY OF CALIFORNIA, Oakland, CA (US)

(72) Inventors: Benjamin Arthur Bazor, Davis, CA (US); Zijie Zhu, Davis, CA (US); Tingrui Pan, Woodland, CA (US)

(73) Assignees: TACSENSE, INC., Woodland, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/155,839

(22) Filed: Oct. 9, 2018

(65) Prior Publication Data
US 2019/0107887 A1  Apr. 11, 2019

Related U.S. Application Data

(60) Provisional application No. 62/570,058, filed on Oct. 9, 2017.

(51) Int. Cl.
*G06F 3/01* (2006.01)
*G06F 17/00* (2019.01)
(Continued)

(52) U.S. Cl.
CPC .............. *G06F 3/014* (2013.01); *G06F 3/017* (2013.01); *G06F 3/0346* (2013.01); *G06K 9/00355* (2013.01); *G06K 9/00536* (2013.01)

(58) Field of Classification Search
CPC .......... G06F 3/016; G06F 3/014; G06F 3/017; A61B 5/0205
(Continued)

(56) References Cited

U.S. PATENT DOCUMENTS 5,471,405 A * 11/1995 Marsh ................. A43B 3/0005
702/41
6,537,226 B1  3/2003  Marcoyannopoulou-Fojas
(Continued)

FOREIGN PATENT DOCUMENTS

| CN | 104199566 B | 4/2017 |
|---|---|---|
| WO | 2017/111972 A1 | 6/2018 |

OTHER PUBLICATIONS

"PCT Search Report and Written Opinion, PCT/US2018/055090", dated Jan. 22, 2019.

*Primary Examiner* — Manglesh M Patel
(74) *Attorney, Agent, or Firm* — Kurt T. Mulville; VLP Law Group, LLP

(57) ABSTRACT

Pressure-sensor based arrays are integrated into a control device that detects the position, motion, or movement of a one or more body parts of a user to recognize and translate the motion into a unique user-motion profile. The user motion profile may be independently analyzed or recognized as a discrete motion or gesture and used as input or commands for the control device itself or as a signal or set of signals that yields an output signal to a companion device. The pressure sensors can be attached to any body part of a user, such as the user's wrist or ankle. Motion or position, or changes therein, of the user generates an output signal that may be used to control a companion device. The source of the detectable signal is the pressure-based sensor array that yields a pressure data profile that is translated into an output signal to control the companion device.

17 Claims, 6 Drawing Sheets

Normal Human Hand Gestures

| Arm Movement | | Finger Movement | | | |
|---|---|---|---|---|---|
| $dx^2/d^2t$, $dy^2/d^2t$, $dz^2/d^2t$, Θ, γ, φ, dΘ/dt, dγ/dt, dφ/dt | | Thumb | Index | Others | Gesture |
| | | F | F | F | Close* |
| Palm Movement | | F | F | N | OK |
| Adduction | Toward the little finger side | F | N | F | Pointing* |
| Abduction | Toward the thumb finger side | F | N | N | Good |
| Flexion | Toward the body side | N | F | F | Four |
| Extension | Off the body side | N | F | N | N/A |
| | | N | N | F | Gun*# (Grip) |
| Level 1 | Level 2 | Level 3 | N | N | N | Open |

(Level 1 is easier and more important to detect)

*Combo 1: Dynamic arm movement & Static finger movement
Combo 2: Static arm movement & Dynamic finger movement

US 10,928,905 B2
Page 2

(51) Int. Cl.
*G06K 9/00* (2006.01)
*G06F 3/0346* (2013.01)

(58) Field of Classification Search
USPC .................................................. 715/200, 702
See application file for complete search history.

(56) References Cited

U.S. PATENT DOCUMENTS

| | | | |
|---|---|---|---|
| 9,596,988 B2 | 3/2017 | Irazoqui et al. | |
| 9,649,037 B2 | 5/2017 | Lowe et al. | |
| 9,730,494 B1 | 8/2017 | Feinstein | |
| 10,136,858 B2 | 11/2018 | Shigihara et al. | |
| 10,213,116 B2 | 2/2019 | Chowienczyk et al. | |
| 2004/0030581 A1* | 2/2004 | Leven | A61B 5/0002 705/2 |
| 2004/0178997 A1* | 9/2004 | Gillespie | G06F 3/03547 345/173 |
| 2006/0173363 A1 | 8/2006 | Felder et al. | |
| 2006/0187214 A1* | 8/2006 | Gillespie | G06F 3/03547 345/173 |
| 2008/0048997 A1* | 2/2008 | Gillespie | G06F 3/03547 345/174 |
| 2010/0058834 A1 | 3/2010 | Cobianu | |
| 2010/0313050 A1* | 12/2010 | Harrat | G06F 1/3203 713/323 |
| 2012/0280905 A1* | 11/2012 | Vonog | G06F 1/1694 345/156 |
| 2013/0331993 A1* | 12/2013 | Detsch | G05B 15/02 700/275 |
| 2014/0129239 A1* | 5/2014 | Utter, II | G06Q 50/22 705/2 |
| 2014/0249853 A1* | 9/2014 | Proud | G06Q 50/24 705/3 |
| 2015/0073907 A1* | 3/2015 | Purves | G06Q 20/32 705/14.58 |
| 2015/0124566 A1* | 5/2015 | Lake | G04G 21/08 368/10 |
| 2015/0227180 A1* | 8/2015 | Rabii | G06F 1/26 713/323 |
| 2015/0301608 A1* | 10/2015 | Nagaraju | G06F 3/0488 345/156 |
| 2016/0025669 A1 | 1/2016 | Sun et al. | |
| 2016/0266649 A1* | 9/2016 | Wang | G06F 3/017 |
| 2016/0334870 A1* | 11/2016 | Priyantha | G06F 3/041 |
| 2017/0238820 A1 | 8/2017 | Yuasa et al. | |
| 2017/0262064 A1* | 9/2017 | Ofir | G06F 3/017 |
| 2018/0000205 A1* | 1/2018 | Chinowsky | F21V 33/0008 |
| 2018/0020963 A1* | 1/2018 | Friant | A61B 5/165 705/14.66 |

\* cited by examiner

Normal Human Hand Gestures

| Arm Movement | | Finger Movement | | | |
|---|---|---|---|---|---|
| $dx^2/d^2t, dy^2/d^2t, dz^2/d^2t, \Theta, \gamma, \phi, d\Theta/dt, d\gamma/dt, d\phi/dt$ | | Thumb | Index | Others | Gesture |
| | | F | F | F | Close* |
| | Palm Movement | F | F | N | OK |
| Adduction | Toward the little finger side | F | N | F | Pointing* |
| Abduction | Toward the thumb finger side | F | N | N | Good |
| Flexion | Toward the body side | N | F | F | Four |
| Extension | Off the body side | N | F | N | N/A |
| | | N | N | F | Gun*# (Grip) |
| Level 1 / Level 2 / Level 3 | | N | N | N | Open |

(Level 1 is easier and more important to detect)

*Combo 1: Dynamic arm movement & Static finger movement
Combo 2: Static arm movement & Dynamic finger movement

FIG. 4

GESTURES & COMMANDS

| PPT Controller | | Mouse Controller | | Game Controller | |
|---|---|---|---|---|---|
| Gestures | Commands | Gestures | Commands | Gestures | Commands |
| Open | Zoom in | Open | Drag Release | Open | Release (button C) |
| Close | Zoom out | Close | Drag | Close | Hold (button B) |
| Flexion | Next slide | Flexion | Undo/Back | Flexion | Move left |
| Extension | Previous slide | Extension | Forward | Extension | Move right |
| Pointing | Laser | Click (thumb & index) | Left-Click | Gun | Shooting (button A) |
| Adduction | Pull down Menu list | Click (thumb & ring) | Right-Click | Adduction | Move down/speed up |
| Abduction | Push up Menu list | Abduction | Page Roll up | Abduction | Move up/speed down |
| Good | Select | Adduction | Page Roll down | Good | Select (button D) |

| Level 1 | Level 2 | Level 3 | | Critical Functions | Optional Functions |

(Level 1 is easier and more important to detect)

FIG. 5

SINGLE TENDON ANALYSIS
Physiological Interfacial Pressure Changes

| Gesture | T1 | T2 | T3 | T4 | T5 | T6 | T7 | T8 | T9 | T10 | T11 | T12 | T13 | T14 |
|---|---|---|---|---|---|---|---|---|---|---|---|---|---|---|
| Open | ↑↑ | ↑ | ↑ | ↑ | ↑↑ | ↑↑ | ↑↑ | ↑↑ | ↑↑ | ↑↑ | ↓ | ↓ | ↓ | ↑↑ |
| Close | ↓ | ↓ | ↓ | ↑ | ↓ | ↓ | ↓ | ↓ | ↓ | ↓ | ↑ | ↑ | ↑ | ↓ |
| Flexion | ↓↓ | ↓↓ | ↓↓ | ↓ | ↓↓ | ↓↓ | ↑ | ↑ | ↑ | ↑ | ↑↑ | ↑↑ | ↑↑ | ↑↑ |
| Extension | ↑↑ | ↑↑ | ↑↑ | ↑↑ | ↑↑ | ↑↑ |  |  |  |  |  | ↓↓ | ↓↓ |  |
| Abduction | ↑↑ | ↑ | ↑ |  | ↓ | ↓ | ↓ | ↓ | ↓ | ↓ |  |  |  | ↑↑ |
| Adduction | ↓ |  |  | ↑ | ↑↑ | ↑↑ | ↑↑ | ↑↑ | ↑ | ↑ |  |  |  | ↓ |
| Pointing |  | ↓ | ↓ | ↓ | ↓ | ↑ | ↓ | ↓ | ↓ | ↓ | ↑ | ↑ | ↑ |  |
| Gun | ↓ | ↓ | ↓ | ↓ |  |  |  |  |  |  | ↑ | ↑ | ↑ |  |
| OK |  |  |  | ↓ | ↓ | ↑ | ↓ | ↓ | ↓ | ↓ | ↑ |  |  |  |
| Good | ↓ | ↓ | ↓ | ↓ | ↓ |  |  |  |  |  |  | ↑ | ↑ |  |
| Four |  |  |  |  |  | ↑ | ↓ | ↓ | ↓ | ↓ |  |  |  |  |

Level 1  Level 2  Level 3
(Level 1 is easier and more important to detect)

Flexors on Palm Side
Extensors on Back Side

BODY MOTION AND POSITION SENSING, RECOGNITION AND ANALYTICS FROM AN ARRAY OF WEARABLE PRESSURE SENSORS

All references cited herein, including but not limited to patents and patent applications, are incorporated by reference in their entirety. This application claims priority to United States Provisional 62/570,058, filed Oct. 9, 2017.

BACKGROUND OF THE INVENTION

A wide variety of electrical and mechanical devices can be coupled with a separate control device that takes input from a user that is sensed, recognized, and analyzed to interpret the input from the user and convert that input into output that can be used for a variety of purposes. Input from the body of a user that is sensed and recognized by a control device can be communicated with a companion device and this process of sensing, recognition, and analysis enables the user to manually manipulate the control device to create data output. This data output can be used for independent analysis of the motion of the user, or translated into command or control instructions to the companion device. Examples include keyboards, touchpads, computer mice, microphones, numeric keypads, pedals and a variety of other input devices that are in common use and that are typically operated by hand or by foot. In these examples, motion imparted by the user to the device, such as by striking individual keys of the keyboard, moving a computer mouse, entering sound into a microphone, or actuating a pedal, results in an output that instructs the companion device, such as a computer to implement certain steps. As will be apparent from these examples, coupling the specific input from the user to the desired output to the companion device is an integrated process that is designed so that the most convenient way for the user to provide the input is translated into the data output that is necessary for the companion device to function.

The wide variety of input devices reflects the wide range of companion devices that can be controlled by manual input from a user, and includes, but is not limited to, computers, telephones, video displays, control and security systems, and virtually any device or system having a controlling mechanism or an interface wherein the user directs control of the device through an input or interface.

Most users are familiar with input devices such as keyboards and numeric keypads where manual contact with a mechanical key or button or touching a space in a screen or visual field translates into a single letter, number, or other instruction such as turning a device or or off or causing the companion device to execute some predetermined function. In order to make these input devices faster, more efficient, and generally more convenient, several motion or movement detector apparatus have been developed that can be physically attached to a body appendage, such as a hand, wrist, or foot of a user and can translate motion or gestures by the user into data input or instructions, even if performed completely in "space," i.e. where the user makes no direct contact with any input device.

United States Patent Publications 2016/0091980 (Apple Inc.) and 2017/0031453 (Philips N. V.), specifically incorporated herein by reference, each describe apparatus that detect hand movements using optical sensors that rely on a paired optical emitter and a series of optical detectors to discern hand motions based on differences in the light passed through the anatomical structures of the wrist as the hand makes certain gestures. These devices are designed to detect gestures based on the detection of light and then to translate the light signals into data input. For example, by arranging light emitting devices and light detecting sensing devices around the wrist, these devices sense difference in light transmitted through bones, muscles and tendons and the user moves their hand and, based on the motion of the user's hand and wrist, the devices translate the difference in transmitted light into instructions that can control a watch, a computer, or another device. For example, the system may detect a hand waving motion of a user to signify some action, such as turning a computer on or off, and can detect the differences in the light transmitted through tissue during the movement of a user's individual fingers to translate different finger motion into discrete signals to control a companion device.

These existing devices are typically coupled to a data processing unit that translates the sensed light signals from the user's motions or gestures into a particular output signal. For example, the combination of the sensor and the data processing unit might detect the difference in the optical characteristics of a user's bones, muscles, and tendons as a user extends one finger as opposed to two fingers, recognize these as different signals, and then instruct a companion device to perform different functions. Accordingly, a change in hand and finger motion between extending one finger versus extending two fingers could be the difference, for example, between turning a computer or cell phone "on" or off." These devices can also be combined with motion and electrical sensors to generate a mixture of signal inputs or a multiplex that combine with optical emmitters and sensors to reflect the motion, movement, or gesture of a user.

While devices that are primarily based on optical sensing arrays can distinguish a number of individual movements of a user, these devices have certain drawbacks inherent in the use of light or electrical signals to detect motion, including the inherent potential for background noise in the form of extraneous light or electrical signals to compromise the accuracy of the detected signal. Furthermore, light emitting devices tend to require significant power to operate and the power requirements can result in the requirement for associated large and bulky power storage devices or result in limited operational life for any device based on light or electrical sensors.

SUMMARY OF THE INVENTION

The present invention is a pressure-sensor based array integrated into a control device that detects the position, motion, or movement of a one or more body parts of a user to recognize and translate the motion into a unique user-motion profile. The user motion profile may be independently analyzed or recognized as a discrete motion or gesture and used as input or commands for the control device itself or as a signal or set of signals that yields an output signal to a companion device. The pressure sensors can be attached to any body part of a user, but are preferentially attached to a user's wrist or ankle or other body part that can be surrounded by a plurality of sensors forming an array and that is commonly used to provide input to a companion device. For example, a pressure-sensor-based device attached to the wrist detects multiple individual components based on underlying physiological structures comprising movements of the muscles, tendons, and bones in the user's wrist, hand, arm, and fingers to translate the position, motion, or movement into a detectable signal that can be used to generate an output signal that is decoded to control the companion device. The source of the detectable signal is the pressure-based sensor array attached to the appendage of the user, for example, an array attached to the wrist detects individual motion of the muscles, tendons, and bones in the same fashion that an array attached to the ankle similarly detects motion of the muscles, tendons, and bones of the foot or toes to generate a signal that yields an output signal that controls a companion device.

For ease of reference, the term "motion" is used hereafter to describe each of sensing an initial, resting, or baseline position of a portion of the user's body as a first position, sensing a transitional motion away from the first position, such as a distinct movement or gesture representing a command, and sensing a final or second position, distinct from the first position where the difference between the first and second position and/or the translational motion is interpreted as a signal or input, preferably to control a companion device. Accordingly, the device of the present invention can sense motion as an active process as the user moves or can detect the difference between the position of the body at an initial verses and a final position or combinations of each, recognize these motions or change in positions, and generate a specific motion profile for analysis, including translation into a profile for analysis upon repetition of for interpretation as a control for a companion device.

Functionally, the device of the invention detects pressure at a plurality of points along and/or around the body part of the user and takes unique pressure measurements generated by motion to translate the pressure reading values into a unique quantitative pressure profile that is analyzed and translated into any one or several discrete data profiles including, but not limited to motion profiles, discrete gestures, and instructions to a companion device. For example, pressure sensors circumferentially located around and that specifically selected points along the interior surface of a band attached to the wrist detects pressure values that are characteristic of the movement of the forearm, the hand, the wrist, the fingers, or any individual unit or combination thereof, including movement of the individual fingers, both individually and collectively two specified numbers or letters of the alphanumeric alphabet. The distinct movements of the body generate different and characteristic pressure values and assembled profiles and, by using a number of pressure measurements both individually and collectively, these body movements can be recognized and correlated with gestures that are translated into output, such as the commands used to control a computer. Because of the sensitivity and selectivity of the specific pressure sensors used in the present invention, characteristic movements of the body part(s) can be used to discriminate between subtle motions performed by the user, recognized, output as unique quantitative data profiles, and analyzed as specific motions or ranges of motions, and optionally assigned to specific command and control functions for a companion device.

To maximize the information obtained from the motion of a user, a plurality of individual pressure sensors are combined to establish a pressure sensor array may be combined with different types of sensors that are designed to detect other parameters at the same or different regions of body tissue, including selected portions of tendon, ligaments, muscle, bone, interstitial tissue, veins, arteries, and any body part that causes static or differential measurements in addition to pressure readings at the surface of the skin at a point engaged by an individual pressure sensor. The combination of the sensor array and the additional sensor may also include detectors for pulse blood flow or other physiologic parameters as well as sensors for acceleration, rotation, or changes in an electric or magnetic field. Collectively, the signals from the all of the sensors create a data output and a sensor profile wherein each movement of the user's appendage generates specific and quantitative pressure profiles that are unique to the individual motion and optionally to the individual. Accordingly, the motion of a user holding out a single index finger it is readily distinguished from the motion of a user holding out the index and middle finger and the unique and specific pressure sensor profile of each motion or gesture yields a discrete command or data output that is preferably processed into a pressure-based data profile that is analyzed and may be translated into input or command and control instructions for a companion device.

When such an array of sensors comprising the pressure sensor array is deployed as described herein, a localized, optionally circumferentially oriented, pressure data "map" can be constructed for any motion of any appendage or body part. As the number and density of pressure sensors increases, and the individual pressure data values are assembled in greater numbers, more information regarding the position or motion of the underlying body structures is gathered for subsequent analysis and generation of an output instruction to a companion device. In the case of a single sensor spanning the circumference of the wrist, the tension (related to wrist expansion/contraction, as is the case in flexion & extension of the hand) can be determined based on individual and collective motion of the underlying physiological structures.

When the number of sensors increases and the size of the individual sensors decreases, the sensor size may approach the average tendon size (roughly 4 mm). Accordingly, as the number of sensors increases (for example an array of more than 6, 8, 10, 12. 14 16, 18, 20, 22, 24, 32 or 64 individual sensors), the number of sensors exceeds the number of underlying physiological structures whose pressure is being detected and the sensor data assembled is comprised of a discrete measures of a plurality of individual anatomical structures.

Accordingly, two adjacent sensors may each be detecting a pressure contribution from any one or more underlying anatomical structures, including but not limited to, one or more tendons, one or more muscles, one or more ligaments, and/or one or more bones. When the number of sensors approaches double the number of measured body features (such as a combination of tendon, muscle, bone, etc; totaling approximately 18 features), then the individual sensors more directly measure individual physiological structures and particular motions of the appendage can be tracked even more precisely using each individual physiological structure, or a combination of one individual physiological structure combined with a multiplex of sensor data from an additional individual or plurality of individual physiological structures. A signal processing technique called de-aliasing allows for separation/targeting of the changes that affect multiple sensors. A similar technique can allow for adaptation for variation in sensor rotation about the wrist. In cases of an array comprising fewer sensors then the total number of sensed physiological structures, (for example 8 sensors in the array disposed around more than 8 tendons), tendon groups can be tracked and most natural hand positions can be determined (including but not limited to hand flexion/extension, adduction/abduction, and various finger flexion/extension (See FIGS. 4-6).

The control device may have a dedicated power supply and circuitry to connect the individual pressure sensors to at least a data storage medium and optionally logic circuitry for recognizing specific pressure profiles and analysing same, the signal processing for the quantitative and unique pressure profiles may be housed either in the control device or in a companion device. Accordingly a control device attached to the wrist may process command and control functions generated by the pressure profile or the pressure profile may be communicated to a companion device such as a computer, phone, game controller, or other apparatus containing logic circuitry to translate the motion into command-and-control functions. Preferably, the data is collected in at least three, but preferably five or more threshold pressure values. For example a particular sensor might detect zero change in orientation or motion, a small positive change in pressure resulting from motion, a large positive change in pressure resulting from motion, a small negative change in pressure or a large negative change in pressure. Individual threshold values can be preset in addition to discrete quantitative values to assemble the unique and quantitative pressure profile as described herein.

By combining the data from a plurality of individual sensors deployed in the array, individual pressure profiles corresponding to specific individual or discrete motions, range of motions, or assembled sets or subsets of motions can be recognized to establish a motion pattern or deviation from a pre-existing pattern. Any absolute or relative measurement of the motions, ranges, or patterns of motions, can be analyzed and used to generate a quantitative score that reflects the individual or combined/multiplex pressure measurements both individually or collectively and in comparison to a prior individual motion or assembled set of motions. Individual or collective motion scores can be correlated with types of user-performed motions that are characteristic of a function intended to be performed by the user or a control or command intended by the user to control a companion device.

If the pressure profile is correlated with a particular gesture by the user, the gesture can each be assigned a command or control function for the control device or for a companion device. For example, a set of pressure changes detected across at least six tendons might indicate a specific hand gesture that corresponds to one particular command output. Similarly small changes in four or more tendons combined with no changes in two tendons might indicate a different specific hand gesture and a different particular command output. In practical use, the set of muscle, tendon, ligament, and bone orientations and motions created when a user creates a closed fist might instruct a companion device to "power on", while the unique set of muscle, ligament, tendon and bone motions when a user points an index finger might direct a companion device to open a particular program or to "power off". As described in detail below, a large number of motions and gestures can be measured and assigned different command and control instructions either by pre-programming or in a learning mode at the direction of the user. All of these functions and many more will be appreciated by one of ordinary skill in the art from the following description and figures.

BRIEF DESCRIPTION OF THE FIGURES

FIG. 4 is an assembly abnormal human hand gestures made up of arm movements, finger movements, and palm movements.

FIG. 5 is an assembly of gestures and commands that might be correlated to pressure sensor data and showing how certain gestures would be translated into commands for three different controller examples.

FIG. 6 is a chart showing representative change in physiological interfacial pressure across fourteen individual tendons located in the right hand wrist. Blank fields indicate no change in pressure, single downward arrows indicate a small reduction in pressure values, dual downward arrows indicate a larger reduction in pressure values, single upward arrows indicate a small increase in pressure values, and dual upward arrows indicate a larger increase in pressure values. The left axis contains the at least 11 individual orientations or command-and-control functions that can be assigned to the specific combination of pressure changes across the tendons as measured.

DETAILED DESCRIPTION OF THE INVENTION

Figure 1:
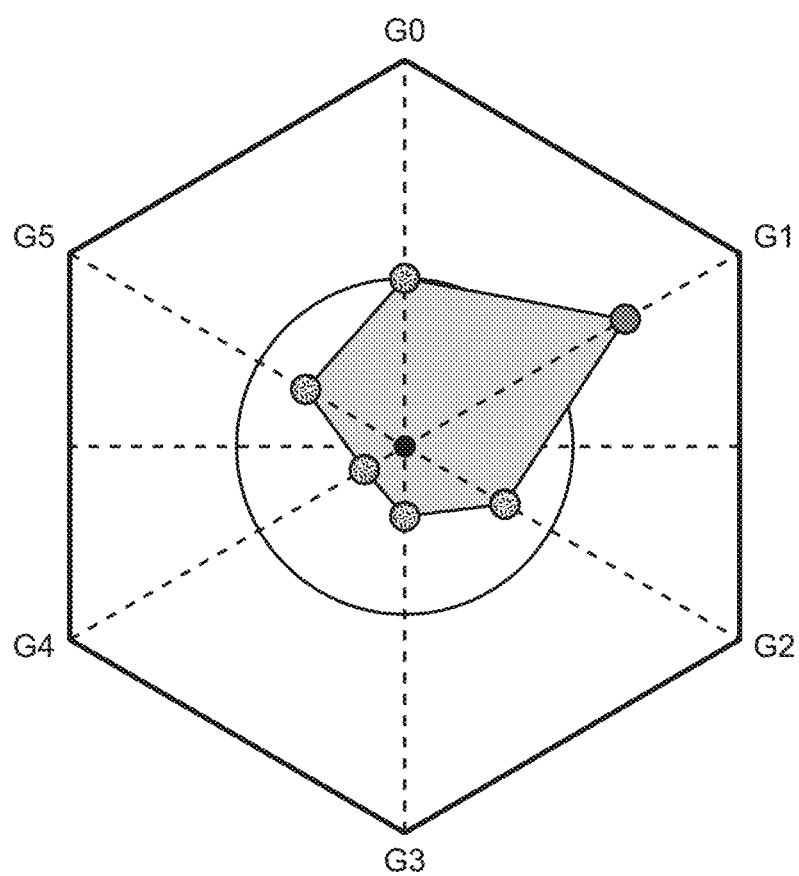
FIG. 1 is a graphic of six individual metrics (G0-G5) representing individual elements of a quantitative gesture detection data profiles of the control device of the invention. The combination of metrics, based on the individual amplitudes of the individual metrics yields a unique and quantitative gesture detection score based on the specific, individual pressure values input from the sensor array and reflected in the metrics G0-G5.

The invention is each of a pressure-sensor-based control device comprised of individual pressure sensors forming an array, the control device combined with a companion device, and methods for their use that employ a plurality of pressure sensors to detect a user's motion to generate data, data profiles, quantitative pressure signatures, defined gestures, control instructions, commands or other input that are directed to the control device or to the companion device(s) based on sensor input from a plurality of sensors that form an array. The control device is physically attached to an appendage of the user by any structural or mechanical expedient that causes the array to be securely positioned to the appendage such that the pressure-based sensors are capable of detecting pressure generated by sub-dermal anatomic structures positioned in any of a first configuration or initial resting state, a series of movements comprising a transitional movement state or range of states, and a resulting second state that follows the transitional movement, is different than the first configuration and may be followed by any number of distinct following configurations.

Although the sensor input relies on the plurality of pressure sensors, additional optical sensors, acceleration or inertial sensors, gyroscopes or other rotational sensors, and magnetic sensors, can independently provide input relating to the motion of the user and can be combined with the pressure sensor data as described herein. In some embodiments data from the pressure sensor array is integrated with data from at least 3 of each of accelerometers, gyroscopes, and magnetometers.

Based on the detected motion, the control device generates input to the control device itself or to the companion device, and the device and/or the companion device performs an operation based on the input. The input from the control device can be combined with other conventional user interface mechanism such as keyboards, keypads, touchscreens and the like such that the control device of the present invention operates in concert with an existing input device. Examples of the companion devices include but are not limited to computers, cellular phones, video display apparatus, gaming, sports or other interactive consoles, robotic motion and other remote manipulation systems, musical instruments, medical equipment, automobiles, appliances and virtually any electronic or mechanical device capable of accepting an input to control the status or operation of the companion device.

In some examples, the plurality of pressure sensors forming the pressure sensing array are located on the control device itself or located on an attachment to the companion device containing the sensor array. For example, the sensor array can be located in an integrated assembly of the control device and a wristwatch as the companion device or can be a discrete advice that is separate from a wristwatch but is operably connected by any conventional communication mechanism such as Bluetooth, a wired connection, optical or wireless transmissions or any other commonly available data transmission mechanism or method.

The pressure sensor arrays generate a unique and specific pressure profile based on sub-dermal pressures exerted by the user's tendons, ligaments, skin, muscles, and bones. In some embodiments, the control device is comprised of functional sensing materials that are conventionally used in clothing or other worn items attached to the user such as watches, hats, jewelry, bandages or other constructs that cause the pressure sensor array to be held in close conforming engagement with the surface of the skin and to maintain a substantially consistent orientation at the surface of the user's body such that absolute or relative motion by the user causes change in the specific pressure profile sensed by the control device.

Example 1—Pressure Sensor-Based Control Device Integrated into Conventional Band Materials (Fabric, Leather, Silicone, Polymer, Metal, or Combination)

In this example, the pressure sensor array is embedded into a watch band and the band functions as a control device. The sensors surround the wrist circumferentially, and due to the absence of rigid sensor components, are held in conforming engagement with the surface of the skin of the user as with a typical watch band. Flexible individual pressure sensors form an array and are integrated or embedded as part of the band materials such that the band area comprises a sensor array that covers the substantial circumference of the wrist, or that substantial circumference not otherwise occupied by a control device or a companion device. Accordingly, where the sensing array covers the entirety of the band, the array spans the entire wrist such that the sensors are positioned about the entire circumference of the appendage and this configuration maximizes the sensing inputs from the individual pressures exerted at the skin surface and maximizes the data as the number of sensors increases. As will readily be appreciated, a greater number of sensors may be disposed around a smaller arc surrounding an appendage and, depending on the underlying physiology, the resulting data profile will be dependent on both the area covered by the sensors as well as the number of sensors disposed in the array. Preferred embodiments for both the number of sensors and the extent of coverage around the body appendage are described below and in the accompanying Figures.

Viewing the band along an axis traversing the center of the wrist, the angle delta ($\delta$) defines the discrete portion(s) of the circumference in which the individual sensors are deployed. For example, if the sensors are deployed about the entire circumference of the band, the angle $\delta$ would be 360°. Similarly, if a portion of the band is occupied by a housing of a control device or companion device, such that the individual sensors are disposed about three quarters of the circumference of the band the angle $\delta$ would be 270°. The specific angles contemplated by the pressure sensor array of the invention include angles $\delta$ greater than 90°, greater than 120°, greater than 150°, greater than 180°, greater than 210°, greater than 240°, greater than 270°, and greater than 330°, and integral values therein.

Example 2—Sensor Specifications

The individual sensor is preferably comprised of an ionic sensor as described in U.S. Pat. Nos. 9,170,166; 9,459,171; 9,739,679 (and pending applications US 2017/0059434 A1 & application on Fabric sensor filed May 25th). The sensor is preferably fabric-based, thin (500 μm or typically 1.5 mm), and conforms to the external surface of curved surfaces of the body such as the wrist, forearm, ankle, cranium, neck, chest, or abdomen. The sensors can also be integrated into clothing and customized in size, material, and sensitivity depending on the application.

The individual sensors must have an operational pressure range to detect the largest pressure changes from gestures and account for the baseline pressure from the tension of the band (ranging from 0-100 mmHg). Biasing structures can change the minimum operational pressure away from 0 and maintain the size of the range of maximum sensitivity (for example 40-70 mmHg for a region of high baseline pressure). An operation range of 0-30 mmHg (with biasing structures) is ideal but can go as low as 0-10 mmHg or as high as 0-120 mmHg. For basic gesture detection, changes in pressure as low as 4 mmHg must be detectable and distinct from noise thus a sensitivity (pressure resolution) and noise level no greater than 1 mmHg and a repeatability error no greater than 50%. For advance gesture detection changes in pressure as low as 0.5-1 mmHg must be detectable. Thus sensitivity and noise level are no greater than 0.2 mmHg and most preferred at 1 Pa (0.0075 mmHg) and a repeatability error below 10% is most preferred. In the case of position detection (rather than transitional/movement detection), accurate pressure readings is required. Considering accuracy errors from noise, linearity, and repeatability, the system must accurately quantify tendon pressures into 3 to 5 categories. An accuracy of ±5 mmHg (83.3% of full scale range) is preferred for detecting basic hand positions, and an accuracy of ±1 mmHg (96.7%) for advanced hand positions, and an accuracy finer than ±0.5 mmHg (98.3%) is most preferred. The linearity and repeatability accuracies must exceed the requirements of gross accuracy. Such that 90% accuracy in linearity and repeatability is preferred for basic positions, 98% for advanced positions, and 99.5% is most preferred.

The signal-to-noise ratio is greater than 100 to 1 (equivalent to 0.3 mmHg) is preferred and a ratio of 1000 to 1 is most preferred.

The sensor array preferably has a total vertical height normal to the surface of the user's skin of 0 mm (conformal contact), preferably no greater than 0.5 mm and most preferably no greater than 1.1 mm. The control device has a FPC-type connector preferably with a number of positions related to the number of sensors (Sn). In some embodiments, the positions is Sn+1 (for example 9 positions for 8 sensors) and others, the closest integer greater than or equal to the twice the square root of Sn (ceiling(2*sqrt(Sn))) (for example 8 positions for 16 sensors). A pin spacing of 1 mm is ideal and can range from 0.25 mm to 2.54 mm.

Pressure data using the aforementioned pressure sensors can be acquired at low power. Power consumption being highly proportional to the sampling rate. 125 Hz & 16 mA being typical of a high performance pressure sensing system. Theoretical maximum for these sensors due to the response time is 240 Hz. In the case of gesture monitoring, this is excessive. Human movement is typically less than 1 Hz (changes on the order of 1 second) and rarely exceed 10 Hz (changes on 100 ms scale). Humans perceive changes near/below 100 ms as near instantaneous and changes in excess of 50 Hz (20 ms) as instantaneous. A 10 Hz sampling frequency leads to current of 1.6 mA. Along with inertia sensors (gyro, accelerometers, and magnetometers), total current is typically 2.6 mA. Wearable watches have battery capacities between 100-200 mAh, leading to an operational time of 42-78 hours or 5-9 days of 8 hours of continued operation. Power saving features such as sleep mode could extend this dramatically.

Due to the high SNR of the data, little processing is necessary for gesture acquisition (usually simple arithmetic operations) which consume negligible amounts of power. EMG signals require wavelet analysis, strong analog amplification, and CPU intensive de-noising which consume additional power. For reference, the Myo EMG armband is capable of 1 day of operation on a single charge and modular EMG units consume 2-4 mA per channel (or 16-32 mA for 8 channels). Bio-optical systems lose significant power through radiation (light) emission and data processing. These systems are similar to the heart rate monitors of such as the Fitbit®, which for reference are capable of 5 days of operation on a single charge. Note that Fitbit® does not do truly continuous optical monitoring. PPG (optical modules) consume 2.3 mA typically and the power use scales according to the number of sensors. Using an 8-channel optical system+inertia measurement, power consumption would be 19.4 mA, with operational time of 5-10 hours.

In one embodiment, the control device is comprised of a pressure sensor array that is disposed within a continuously flexible structure within the arc of a band or other structure that functions to maintain the sensor array in close conforming engagement with the body appendage. The pressure sensor array is comprised of material substantially lacking in any of glass, rigid transparent polymers, stainless steel, or light emitting or detecting apparatus. Although these components may be included within the control device, or any component of the data storing, data processing, logic circuitry, storage, or communication components of the control device, these structures not included in the individual pressure sensors of the array.

Example 3—Quantitative Analysis of Pressure Sensor Data and Three-Point Analysis of Body Position In a preferred embodiment, the pressure sensor data is quantitative. For example, a tightly held fist (characterized by muscle tension) is quantitatively different than a loosely held fist (characterized by finger flexion and no muscle tension), and is still different from other hand position such as an open palm. Similarly, varying and discrete degrees of finger flex in can also be resolved as pressure increases local to the tendon controlling finger movement. Data from the pressure sensor array may comprise three separate data points comprised of a first initial or resting position of the user's appendage where no motion is occurring, a transitional period during which motion is occurring away from the first position, such as the user's intentional motion of the wrist, hand, or individual fingers, followed by a second position quantitatively different than the first position and which is the result of the motion of the transitional period and results in the second position. Additional motions differing from the first position, and/or the second position, and having subsequent transitional periods may also be detected and quantified.

Electrical systems (EMG) for gesture detection rely on the detection of signals during muscle contraction. This requires electrode proximity to the contracting muscle driving hand/finger motion and the muscle must be actively contracting. This means only states characterized by active contraction can be measured. Passive hand positions such a pointed finger or a loosely held fist have no distinct electrical signal. For detection of a fist, the hand must be clinched. This limits use to only detecting movements/transitions and a prolonged state can only be detected during contraction which quickly leads to muscular fatigue. EMG signals are characterized by high levels of noise, originating from EMF interference, motion artifacts, small ($\mu$V) input signals, bioimpedance changes, and bio-interface changes. The signal amplification and de-noising of these signals in order to arrive at specific gesture detection is power (typically 2-4 mA per channel) and computation intensive.

Optical systems (as described in 2016/0091980 operate with similar equipment and principles as PPG; photoplethysmogram) rely on a light source penetrating and reflecting off body tissues and intensity of this reflected light being tracked by a detector. The major limitation of this system is the power consumption from continuous radiation emission (typically 2 mA per emitter/detector pair) and the susceptibility to noise. The latter is particularly troublesome. While positional changes in the hand can be detected (that is no active muscular contraction is necessary), the noise (noted in 2016/0091980 at paragraph [0039]) and shifting baseline of the light signal makes only transitions reliably detectable. The 2016/0091980 publication at FIG. 9B notes movement detection and the description at paragraph [0040] specifically notes detection of movement. The critical distinction in gesture/position detection for optical systems that prohibits absolute positional detection is that the detected light is not directly related to tendon position. That is there is no particular luminous flux necessarily indicates tendon contraction/relaxation. Signals inputted into the detector are affected ambient light, reflection on the skin, pressure between optical system and skin, and tendon/muscle/bone positions. Changes due to noise sources often exceeds changes in tendon position by an order of magnitude or more. In practice, this makes absolute position detection (for example a prolong state of pointed index finger) in the absence of gesture changes difficult if not impossible to determine.

The essential biological parameter being measured by pressure or optical systems is tendon displacement due to contraction and relaxation. In the case of a pressure-based system, this tendon displacement necessarily creates pressure against a band in tension around the wrist. With a known band tension, the pressure directly relates to the displacement of the tendon. Such that large displacements (such as a fist) cause pressures of approximately 10 mmHg and small displacements (such as pinky finger extension) cause pressures of approximately 1 mmHg. In a well calibrated system, a quantified pressure in a given location has a well-defined significance to the underlying tissues. In this manner, even in the absence of motion, circumferential pressure maps of the wrist can be used to accurately access the tendon/muscle/bone status and determine the hand position/gesture status.

Example 4—Learning Mode for Pressure-Based Gesture Analysis

The control device or the companion device are preferably comprised of storage means to retain the pressure sensor data that yields a unique pressure profile comprising a large number of individual aspects of motion initiated by the user. The pressure profile signature is quantified for: 1) a value for each of the individual pressure sensors, 2) the change in individual values for each of or all of the individual pressure sensors, 3) a plurality of individual or assembled values, an overall quantitative score generated from one or more metrics resulting from input from a plurality of pressure sensors, 4) any of the foregoing at a discrete point in time, 5) any of the foregoing multiple points in time, and including rates of change in the foregoing and changes in the rate of change in the foregoing, and all according to the position or motion by the user.

The control device may also compares the unique pressure profile generated by the pressure array to one or more stored values or profiles comprising unique pressure profiles to determine whether or not an individual user motion or set of motions corresponds to a stored unique pressure profile, and the comparison can generate any of a signal, a new score based on the comparison, a determination that the motion corresponds to a command generated by the control device or the absence of such determination. In one embodiment, the control device compares the unique pressure profile with a stored range of predetermined pressure profiles and correlates the sensed pressure profile with the most similar stored pressure profile and generates a command that is communicated to the companion device. In another embodiment, the companion device has a visual or mechanical option displayed on the companion device to inquire of the user whether or not the interpreted control or command signal generated by the control device is correct.

The control device may be adapted to filter noise caused by motion by the user that is not specific to the generation, determination, or analysis of unique pressure profile or score. The noise can be comprised of random motion by the user, autonomic physiological functions such as breathing, heart rate, or any signal that is extraneous or part of a background signal distinct from the intentional motion of the user. The filtering function may be based on pressure ranges, the presence of known physiological functions established as part of a baseline measurement, or any other factor that distinguishes noise from intentional user-generated signal resulting from the pressure-sensor generated data.

In a preferred embodiment, either of the control device or the companion device contains data storage and logic circuitry or functions to permit one or both devices to operate in a learning or teaching mode wherein user motion is responsive to instructions from either device directing the user to perform particular motions or gestures that are subsequently intentionally performed by the user to provide a stored unique pressure profile individually for the user and for comparison with later gestures executed in a standard operating mode. The user may also identify specific gestures that are associated with unique commands, as directed by the user, so that the user teaches the control device that a specific output generated by the control device command is associated with a particular motion or set of motions or a particular gesture.

In some embodiments, a separate, detachable, and portable control device is comprised of at least six pressure sensors embedded in a an arc δ having an angle of at least 120 degrees of a flexible and wearable device that positions the pressure sensors about the circumference of the surface of the skin of a user's body part, wherein a first quantitatively measured pressure value or set of values is associated with a first position of an appendage of the user, a quantitative transitional pressure vale or set of values is associated with movement of two or more physical structures selected from the group consisting of bones, ligaments, tendons, epidermal layers, muscles, and interstitial tissue, and a second quantitatively measured pressure value or set of values is associated with a second position of the appendage of the user. The control device is operably connected with a data processor containing storage and logic capable of determining a motion by the user is associated with a command to be communicated with the control device or with a companion device.

In one embodiment, the plurality of pressure sensors are located in a control device comprised of an array of pressure sensors embedded in a strap with at least eight, at least sixteen, at least twenty-four, at least thirty-two, or at least sixty-four individual sensors disposed to circumferentially around the strap. The sensor array is operably connected to a data processor containing storage and logic capable of determining that motion detected by the circumferential pressure array is associated with a command to be communicated with the control device or with a companion device. In some embodiments, the companion device is also worn by the user and operably connected, either by wireless transmission or by mechanical connection, to the control device such that the companion device is controlled by a portable electronic device in turn controlled by pressure signatures detected by motion of the user and detected by the control device.

In some embodiments, the control device comprises a pressure sensor array that is separate and independently located in a structure that maintains the companion device at the skin surface proximate to one or more user's tendons, ligaments bones, or muscles located in an appendage of the user. For example, the companion device can be a smart watch and the control device may be comprised of a sensor array incorporated into a band that is comprised of a plurality of sensing regions spaced away from the companion device and that detect a change in pressure at the interface of the pressure sensor in a region proximate to the smart watch and across the adjacent surface of the skin of the user.

The invention also includes methods of using the control device described herein to differentiate from a plurality of individual gestures by the user such that unique gestures can be translated into commands for controlling the companion device. The method of implementing a command based on a user motion may include the steps of determining that a gesture by a user conforms to a predetermined pressure profile detected by the sensor array. The method may comprise: detecting a signal comprised of a pressure sensor value, wherein the value is a quantitative value comparing a unique pressure profile for a first resting position and a transitional pressure value reflecting motion by the user, detecting a change in pressure associated with motion by the user; and determining that the signal corresponds to a specific command for controlling the control device or the companion device.

Referring to the Figures collectively, the invention relates to pressure-based motion detection apparatus for detecting a specific body motion and translating that body motion into output. The body motions are converted into a unique pressure signature and translated into control instructions. In some embodiments, the body motion includes a specific movement of the hand and typically includes a recognized orientation of the forearm/wrist, palm, and fingers that generate the unique pressure signature. The unique pressure signature resulting from the body motion, such as a well-recognized hand gesture, is processed as a measured combination of sensor inputs based on measured pressures, changes in measured pressures, or changes in changes of measured pressure over time. In this fashion, body motion is quantified based on unique pressure signatures and translated into command and control instructions that provide instructions to a control device or to a companion device operably connected to the control device.

Because the pressure sensors described herein are inexpensive to manufacture and offer extremely high pressure sensing performance as described in Example 2, a number of sensors can be incorporated into a control device offering the ability for a large number of individual pressure monitoring data inputs that separately and simultaneously detect discrete motions from a large number of discrete pressure measurements resulting from the position of motion of physiological structures under the skin. The large number of quantitative data inputs permit extremely sensitive and selective unique pressure profiles to be assembled that are discrete and distinctive of specific motions of the body. The pressure sensor array can, therefore, detect body specific motions including retraction, extension, expansion, contraction, rotation and virtually any other motion by the user and can be either voluntary or involuntary and spontaneous and intentional such as motion of the hand in a preselected gesture, or passive and autonomic, such as breathing, pulse, or blood pressure.

Specifically with respect to motions of the hand and wrist that are detected by pressure changes resulting from unique configurations of the forearm/wrist, hand, and fingers, tendon measurements, individual components or collected movements are determined and may be characterized as flexion, extension, abduction, and adduction and combinations of each measure as a score with a weighting profile to every motion, position, change in motion or position over time or change in the rate of change over time. Flexion is generally defined as a motion of the hand wherein the palm moves toward the body side, extension is generally described as a motion of the hand wherein the palm moves away from the body side. Abduction is generally defined as a movement of the hand wherein the palm moves toward the little finger side and adduction is generally defined as a movement of the hand wherein the palm moves toward the thumb side. Finger flexion is defined as the motion of the finger toward the wrist and extension is defined as the straightening of the finger.

With respect to any point on the body, the movement can be characterized as an absolute or relative motion along any of the X, Y, or Z axes, any rotation around an axis $\theta$, $\gamma$ or $\phi$, changes in the position of any point or set of points over time, as well as changes in the rate of change of motion or rotation over time. In addition to the pressure-based sensor array, additional components such as accelerometers, gyroscopes, and magnetometers can be incorporated into the control device with similar measurements of change, rate of change and change in rate of change over time. In a preferred embodiment, three accelerometers, three gyroscopes, and three magnetometers are incorporated with at least eight ion-based pressure sensors used to generate the unique pressure profile. The combination of absolute or relative motion can be incorporated with changes in absolute or relative pressures to create a high selectivity and high specificity motion and pressure-based command that is translated into a specific output, such as a command or control function for a companion device.

Most motion at the elbow and shoulder, and in some cases the hand, have no distinct pressure affects at the wrist and motion by the user, such as displacement along the X, Y, or Z axes, and comprised of some degree of linear or arcuate motion or rotation, our capable of being analyzed as independent metrics. Some user motions, such as internal and external rotation of the hand, palm point up or down, because of both pressure and rotational changes that are detectable at the surface of the skin using the pressure array. Combinations of gestures that combine both movement and rotation of the appendage generate a much greater selection of distinct position states and characteristic movements that may be analyzed and scored. For example, a thumb up position, a thumb side position, and a thumb down position are all distinct position states and rotations wherein a combination of pressure sensors and motion sensors as described herein can yield both pressure signals and motion signals. Repeat gestures, such as tapping the index and thumb together twice, can provide a greater degree of accuracy for interpretation of any motion or gesture and adds to the signal component of a pressure score that is distinct from other common motions properly characterized as noise.

In operation, the end result is that pressure changes sensed around a region of the body of the user are translated into commands for a companion device such as a graphic or video display controller, a gaming console controller or a computer user interface. As perceived by the user, body motions are instantaneously translated into discernible commands any companion device. Accordingly, when the user executes a hand gesture, the composition of the underlying tissue exerts a unique and characteristic pressure profile on the sensor array and the pressure-sensor array, potentially in combination with other motion sensing components, translates the gesture into a specific command that is instantaneously executed in the companion device.

The control device or the companion device is comprised of logic circuitry for comparing any value, set of values or score a stored reference or comparison value, optional treated as a threshold, to determine that the body motion corresponds to a stored body motion parameter that is paired with a specific control command. If the body motion is determined to match the stored value, profile or score, the control device generates the pre-determined command. For example, any of a forearm/wrist, hand, or finger gesture can be to be dependent on generation of a specific pressure detection signature as a collection of movements of each of the forearm, wrist, hand, or fingers or any discrete physiological structure can be separated such that the movement of the hand in any subset of fingers is distinguishable from a different subset of fingers together with a similar or dissimilar hand gesture. In this fashion, any of the individual physiological components, the position, or motion thereof can be assigned as a null set or control value with the individual movement of any physiological structure dictating the output from the control device of a specific control or command.

Equivalent distinctions in quantitative measures can also be based on absolute or relative time signature such that the absolute or relative value of any pressure reading can be expressed or analyzed as a function of time together with or separate from any other measurements. In this fashion, a time interval T1 can be determined for any particular pressure sensor reading, profile or score such that the difference in the time interval from time point T12 time point T2 solely determines a difference in the output from the control device. In other words, a slower motion is distinguishable from a faster motion and the difference between the time necessary to undertake any motion or change in the position can, in of itself, drive degeneration of a command control.

As noted above, the logic circuitry of the control device can be adapted to filter a noise signal generated by extraneous pressures such as those generated by pulse, including a heart rate that changes over time, breathing, blood flow or other autonomic functions. For this purpose, the control device may accept input from reference sensors that are specifically located to account for noise separate from the primary sensor array signal. The control device further may also comprise for sending pressure sensor array output to logic circuitry located in the companion device or elsewhere such that the pressure sensor array data can be further processed to generate command-and-control signals as described herein. In such an embodiment, the companion device comprises a corresponding receiving unit such that the control device in the companion device wirelessly communicate with each other.

In the method of the present invention, the pressure sensor array initially measures a starting, resting, or original first position based on quantitative pressure sensor data and prior to the measurement of any signal from any of the accelerometers, gyroscopes, or magnetometers. Subsequently, the change in pressure sensor array values caused by motion of the user's body is determined and quantified relative to the first position, and optionally in combination with input from any of the accelerometers, gyroscopes or magnetometers. Subsequently, following the transitional movement phase, the pressure sensor data or changes in the pressure sensor data are determined for a distinct second position that is distinct from the first position. The difference between any of the first position, the transitional phase, or the second position is measured and correlated to position or motion of the user's body. For example, where the body motion is a hand motion comprising movement of the entire hand or a movement of a part of the hand, such as the movement of one or more fingers relative to another part of the hand, the difference in position of the hand is determined based on the difference in pressure sensor values or comparative scores is determined to be indicative of a predetermined hand movement and is sent by the control device 1 to the companion device to be controlled by hand movements.

The method may include a termination or verification step wherein a display apparatus or sensory input is provided to the user to affirm or deny that the correct command or control indicator has been generated by the gesture performed by the user. Upon selection by the user, the gesture is disregarded and the data comprised of measurement from the first position, through the transitional phase, to the second position is discarded by the logic circuitry. If the gesture is confirmed, then the command or control is executed.

Typically, signals from accelerometers, gyroscopes, and magnetometers are independent of the signals generated from the pressure array but can be analyzed together with pressure array data to generate output from the control device. In some cases, pressure and position sensors can be linked and scored together. For example, a user motion primarily of the elbow and shoulder results in fewer signals in the pressure sensors and a greater signal in the motion sensors, whereas motions of the hand result in a greater signal from the pressure sensors and less from the motion sensors. One significant exception is the internal/external rotation of the hand (palm up or palm down) wherein caused by rotation of the elbow wherein pressure changes at a pressure array disposed on the wrist may generate the predominant signal greater than the motion-based signal.

Although in above described embodiments the detected body motion is used to control a companion device, in some embodiments, the body motion can be used to control the control device itself such as to power the unit on or off or to initiate communication with a companion device.

Referring specifically to FIG. 1, six individual metrics (G0-G5) represent individual elements of a quantitative pressure detection data profile of the control device of the invention. The combination of metrics, based on the individual amplitudes of the individual metrics G0-G5 yields a unique and quantitative gesture detection score based on the specific, individual pressure values input from the sensor array and may be reflected as an area based on any combination of the magnitude of contribution of the individual metrics G0-G5. In FIG. 1, the combination of the individual metrics is shown by the shaded area disposed around the center point of the graphic. Those of skill in the art will appreciate that this graphic and the specific representation of the individual metrics G0-G5 is only chosen for convenience and any similar graphic could convey the same concept of a combined score based on several measurements of human individual metrics. Furthermore, the specific number of individual metrics as illustrated in FIG. 1 is only representative. Independent of the total number of sensors, a different number of individual metrics could be chosen. Therefore, the number of individual metrics could be less than, equal to, or greater than the total number of sensors.

In any configuration, the input from the individual matrices may be used to generate a quantitative score based on the individual or collective contribution of the matrices. Furthermore, the contribution of the individual matrices may be weighted such that one or more metrics contributes more or less to the final score. Still further, each individual metric may be analyzed over time to determine changes in the metrics over time including the rate of change of any individual metric, or a collection of matrix, over time. The example of FIG. 1 shows six individual metrics G0-G5 from pressure sensor data. Additionally, separate sensors of non-pressure data could be integrated into the profile to either alter the shape of the profile in the X-Y plane or could provide an additional component, such as a Z direction out of the plane of the page, to further enhance the profile. As noted above, the profile can be static or dynamic in the changes in any of the matrices, including their absolute or relative value, change in value, rate of change in value, rate of rate of change, and correlated with the gesture or combination of gestures.

Any absolute or relative measurement of the motions, ranges, or patterns of motions, can be analyzed and used to generate a quantitative score that reflects the combined pressure measurements both individually and in comparison to a prior individual motion or assembled set of motions.

Individual or collective motion scores can be correlated with types of user-performed motions that are characteristic of a function intended to be performed by the user or a control or command intended by the user to control a companion device.

Typically, the individual metrics will not be matched one-to-one to a specific number of sensors or a particular anatomical structure such as a tendon, and because each metric may be a contribution from one or more pressure sensors, the combination of the metrics reflects an combined pressure profile that has a combined contribution from multiple anatomical structures. The pressure profile score corresponding to specific individual or discrete motions, range of motions, or assembled sets or subsets of motions can be recognized and used to establish a motion pattern or deviation from a pre-existing pattern.

Figure 2:
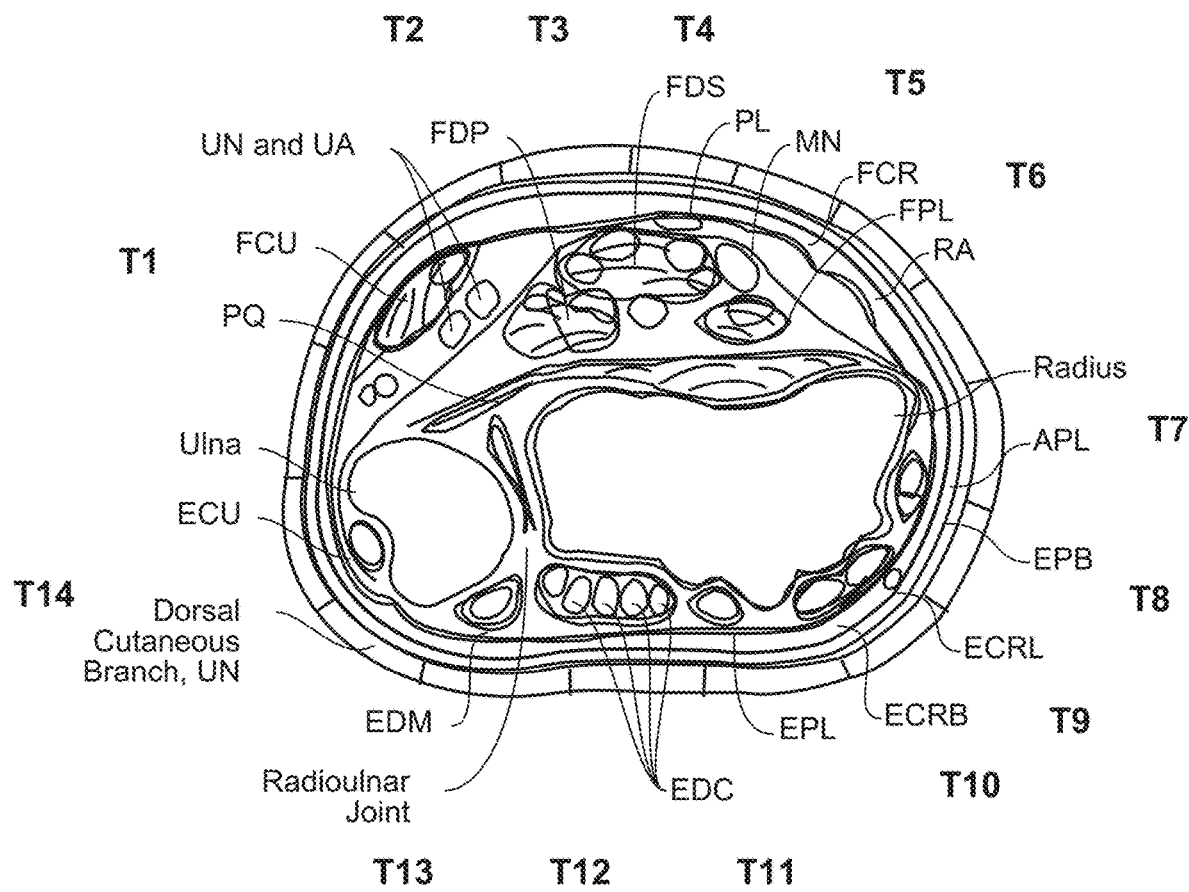
FIG. 2 is a cross-section of a human wrist showing the orientation of individual physiological structures including fourteen tendons, the radius and ulna bones, and other internal anatomic structures such that the placement of a plurality of individual pressure sensors in close conforming engagement with the outer dermal layers of the wrist generates unique and quantitative pressure profiles based on different configurations and motions of the forearm, wrist, hand, and fingers.

Referring specifically to FIG. 2, a cross-section of a human wrist shows the position and orientation of individual physiological structures including fourteen tendons T1-T14, the radius and ulna bones, and other internal anatomic structures such as cartilage, interstitial tissue, nerves and joints. The placement of a plurality of individual pressure sensors in close conforming engagement with the outer dermal layers of the wrist generates unique and quantitative pressure profiles based on different configurations and motions of the forearm, wrist, hand, and fingers. Because of the large number of anatomical structures and their unique position and orientation throughout the range of motion of a human user, the changes in pressure at the surface of the skin can vary tremendously allowing their accurate measurement with the placement of enough pressure sensors having adequate selectivity and sensitivity to detect these changes.

As noted above, a pressure sensor array of the invention may be incorporated into a band structure that surrounds an appendage, such as the wrist, to play sensors at locations that are capable of detecting motion of the underlying physiological structure as reflected as changes in pressure at the surface of the skin. As is apparent from FIG. 2, and as described in greater detail below, the tendons, bones, and other physiological structures are not uniform in their distribution in either the horizontal or vertical direction. Similarly, the positioning and shape of the individual structures changes as one moves up or down the arm and so the position of a band around the wrist may be highly individual to the user. The selection and positioning of the pressure sensors in the array can be tailored to the specific location of each of the tendons, bones, or other structures to specifically detect differences in position with certain motions.

As is apparent from the relative positioning of the sensors, the pressure reading from an individual sensor will reflect those physiological structures that are proximate to the point of contact between the sensor and the region of skin in confirming engagement with the sensor. Because the physiological structures in the wrist are not oriented symmetrically relative to the external surface of the skin, individual sensors will necessarily reflect pressure changes from a different combination of tendons, bones, muscles, and any other structure yielding a differential pressure to the sensor. Accordingly, the pressure data imparted to an individual sensor may be unique to its location around the circumferential exterior of the wrist. For this reason, the band in which the sensors are disposed is designed so that it is placed in the same orientation around the wrist on each individual use. For example, the band may have a tensioning element that keeps the end in conforming engagement with the outer surface of the skin, and serves to orient the positioning of the sensor array so that individual sensors are repeatedly sensing the same combination of physiological structures so that the sensor array data profile is producing similar data on repeated use and so that the data sensor profile can be stored in a data storage element for comparison between individual uses by the user.

Figure 3A:
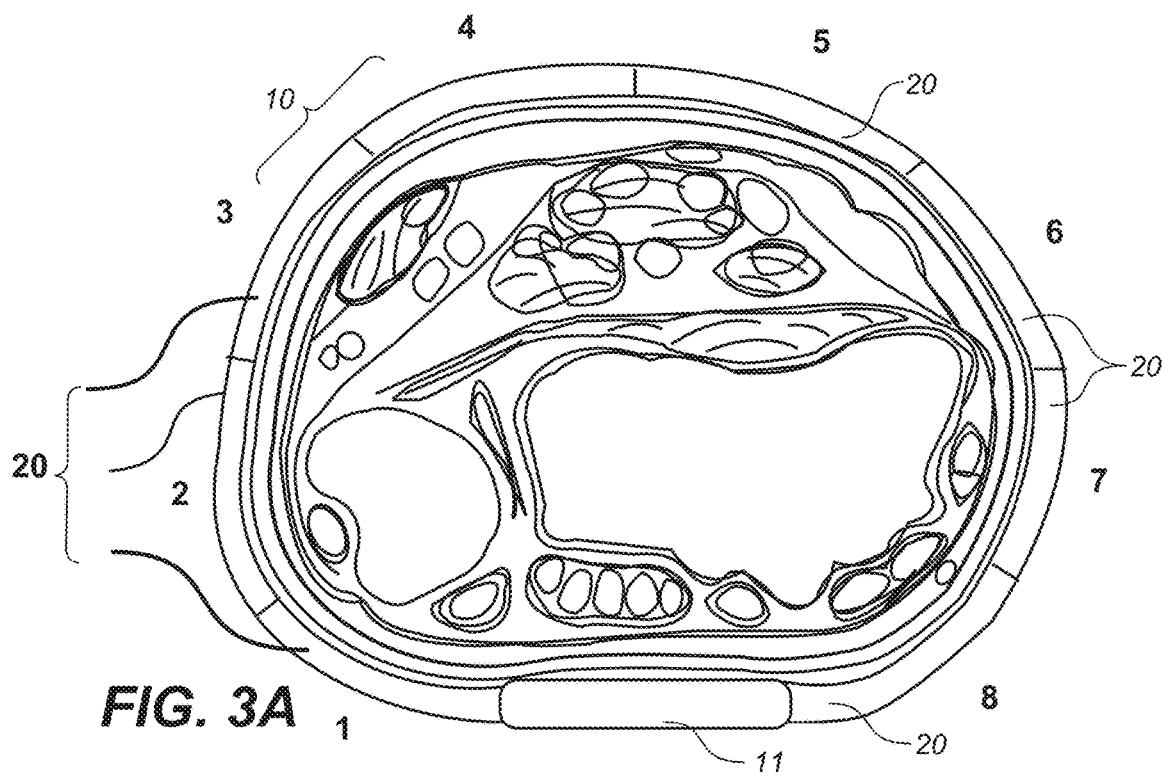
FIGS. 3A and 3B are the control device of the invention in conforming engagement with an appendage of a user showing the orientation of the tendons in physiological structures of the human wrist with sensors placed in close proximity thereto.
Figure 3B:
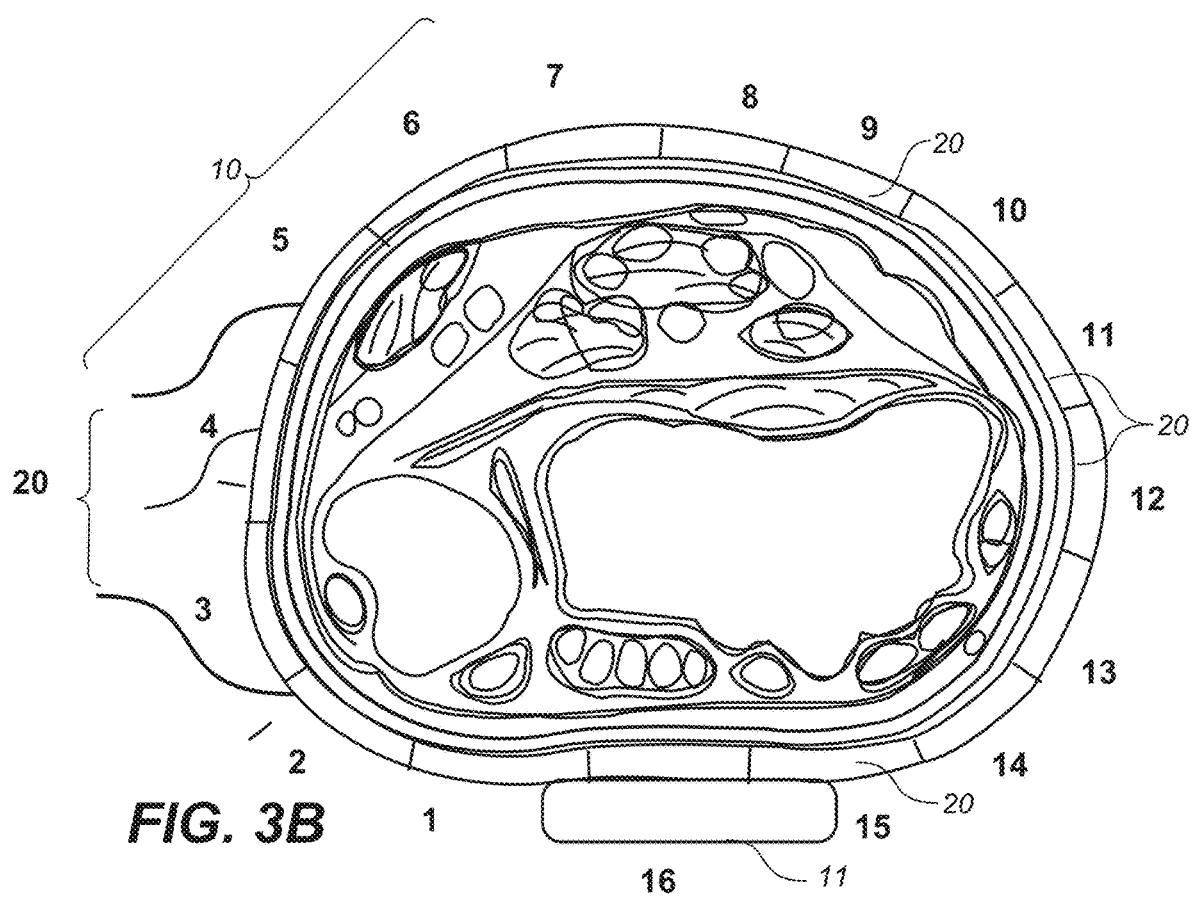

Referring specifically to FIGS. 3A and 3B, the control device 10 is comprised of a plurality of sensors, numbered #1-#8 in FIG. 3A and #1-#16 in FIG. 3B, and a case or housing 11 for containing data storage, power, and logic circuitry to detect and analyze the unique pressure signatures as described herein. Referring to FIG. 3A, the sensor array 20 is comprised of the collection of the individual sensors #1-#8 held in close conforming engagement with the outer surface of the user's appendage. As described above, the sensor array is preferably disposed in a band that has a tensioning element for retaining contact between the sensor array and the outer surface of the skin to maximize detection of changing pressures at each point about the array. As with a watch band, the design of the band and tensioning element places the sensor array repeatedly in the same position relative to the underlying physiological structures of the user so that each subsequent use can reliably compare the pressure sensor data profile from a prior use or calibration to interpret the gestures of the user must accurately.

In the embodiment of FIG. 3A, the sensors around the entire circumference of the appendage with the exception of the portion occupied by the case 11, and so surround approximately 320° of the appendage assuming approximately equal size between the case and any individual sensor. The embodiment of FIG. 3A represents a recognizable example of the sensor array 20 disposed in a watch band with the functional portions of the watch element disposed in the case 11 which can be attached to, or incorporated into the band as with a traditional or digital watch. Preferably, the sensors surround at least 180°, 200°, 220°, 240°, 260°, 280°, 300°, 320°, 340°, and 360°. The number of sensors may be greater than, equal to, or less than the number of tendons. Assuming the presence of 14 tendons as in FIG. 2, each of the eight sensors in the embodiment of FIG. 3A, each sensor is receiving pressure data from more than one tendon as well as the underlying bone, ligaments, joints, subdural tissue, and vasculature. Furthermore, although the individual sensors in the array 20 in both FIGS. 3A and 3B are substantially equal in size and are equally spaced around the appendage, other embodiments may include sensors having different sizes and where the spacing is eccentric around the appendage to take advantage of unique pressure sensors that may arise from the underlying physiological structures at different points around the circumference of the wrist.

Referring specifically to the embodiment of FIG. 3B, the sensor array 20 is comprised of sixteen individual sensors #1-#16 that surround the entire appendage of the user such that the case 11 is separate from the dermal layer and is disposed along the surface of one or more of the members of the sensor array 20. Accordingly, the coverage of the sensor array around the circumference of the appendage is 360°. As described above, in this embodiment, the number of sensors #1-#16 outnumbers the 14 individual tendons and the selectivity and specificity of the control device 10 is increased because more than one sensors can be designated as interpreting sensor data input from an individual tendon. This configuration increases the sensitivity and specificity of the array and, in terms of interpreting individual pressure-based profiles, increases the accuracy of the array. Moreover, as the number of individual $T_1$-$T_n$ sensors in the sensor array 20 increases, smaller changes in motion by the user may be detected and analyzed to generate more precise pressure signature profiles and more subtle motions and gestures may be detected.

Referring specifically to FIG. 4, the normal motion of a human appendage may be detected simply by simple pressure changes as reflected in the output from the sensor array and correlated to a number of motions or gestures based on distinct and identified changes in the input from the array. Specifically with respect to motions of the arm, hand and wrist, detected pressure changes resulting from such individual and collective motion of the arm, hand, and wrist can be detected and correlated to individual motion components. The individual components of the motion may individually or collectively be characterized as flexion, extension, abduction, and adduction and combinations of each measured, and optionally as a score with a weighting profile to every motion, position, change in motion or position over time or change in the rate of change over time. Each distinct combination of motions from the arm, hand, and wrist, generates an identifiable pressure data profile characteristic of the particular motion or gesture that can be used to generate an output signal to the companion device, or stored for further analysis, comparison with the future set of motions or gestures, or used as part of a calibration procedure.

Referring again to FIG. 4, flexion is generally defined as a motion of the hand wherein the palm moves toward the body side, extension is generally described as a motion of the hand wherein the palm moves away from the body side. Abduction is generally defined as a movement of the hand wherein the palm moves toward the little finger side and adduction is generally defined as a movement of the hand wherein the palm moves toward the thumb side. Finger flexion is defined as the motion of the finger toward the wrist and extension is defined as the straightening of the finger. "N" indicates that the orientation of the anatomical structure is in a neutral status or position. Level 1 pressure profiles are easiest to detect and are comprised of arm movements, flexion or extension of the palm, and opening or closing of the hand as detected by finger motion. Level 2 changes in motion are more difficult to detect and are comprised of adduction or abduction of the palm. Level 3 pressure signatures are more difficult to detect and require differentiating between individual motions of the fingers.

As indicated, measuring differences between the thumb and index finger, together or separately with other fingers or anatomical structures allows the pressure data profile to distinguish between forming an "okay" signal, pointing the index finger, giving the "good" or "thumbs up" sign, extending forefingers, or forming a "gun grip" with the fingers and palm, and the opening or closing of the palm." As noted above, the pressure data profile resulting from each set of motions can be translated into an output signal, stored or used as part of an analysis or calibration procedure wherein a pressure data profile resulting from a range of motions is stored and used for comparison to a future action that results in an output signal and a definite construction to a companion device. For example, a user who desires to give the "thumbs up" sign to activate a computer terminal may be instructed to repeatedly perform that structure so that a characteristic set of motions is measured by the pressure sensor array to generate a pressure data profile specific for that user and specific for the measured pressure differences resulting from the selected motion of the physiological structures of the user's wrist. Once an adequate baseline of data is collected, the device is functionally calibrated so that future characteristic motions or gestures by the user are recognized and translated into an output signal.

Referring to FIG. 5, a simple listing of commands shows how the individual motion of the wrist, hand, and fingers could be used to assign individual functions to a companion devices such as a gaming controller, a computer mouse, or within a software program such as Microsoft® PowerPoint® to generate individual commands. Taking the example of the computer mouse in the central column of FIG. 5, opening the hand gives the instruction to "drag and release" the field highlighted by the mass controller. Closing the hand commands dragging the field while flexion of the hand indicates "undo" or "back" while extension of the hand indicates "forward." Forming a circle using the thumb and index finger results in a output signal, command, or control for a "left click" while forming a ring with the thumb and ring finger is a "right click." Abduction or adduction generate the control command for rolling up a page or rolling down a page respectively.

Referring to FIG. 6, FIG. 6 is a chart showing representative change in physiological interfacial pressure across fourteen individual tendons located in the right hand wrist and designated T1-T14 as in FIG. 2 and FIG. 3A-3B. Although the numbering and orientation is arbitrary, in the pressure signature, motion detection, and gesture command schedule described in FIG. 6, and in the exemplary device of FIG. 3B, pressure sensors measure and quantitate, using the five pressure change categories indicated by the arrows, changes across tendons #1-6 from the flexors on the palm side of the wrist/forearm and tendon extensors on the backside of the wrist/forearm. The wide range of detected pressure changes for each of the fourteen tendons for a particular user motion are measured by these criteria and translated into gestures. Referring to the individual boxes of FIG. 6, blank fields indicate no change in pressure, single downward arrows indicate a small reduction in pressure values, dual downward arrows indicate a larger reduction in pressure values, single upward arrows indicate a small increase in pressure values, and dual upward arrows indicate a larger increase in pressure values. By correlating the specific changes to pressure at each of the tendons, a pressure data profile comprised of a plurality of pressure change data is detected and analyzed for pattern recognition and correlation to distinct gestures. The left axis contains examples of at least 11 individual orientations or command-and-control functions that can be assigned to the specific combination of pressure changes across the tendons as measured.

Accordingly for the gesture of opening the hand, the pressure sensor array 20 as shown in FIG. 3B, a large pressure increase is detected for tendon #1, small increases in pressure are detected for tendons #2-#4, large pressure increases are detected for tendons #5-#10, small pressure decreases are detected for tendons #11-#13, and a large pressure increase is detected for tendon #14. Similar changes in pressure can be correlated across the fourteen tendons for the remaining gestures shown in the left-hand column. Although the numbering and orientation is arbitrary, in the pressure signature, motion detection, and gesture command schedule inflected in FIG. 6, and in the exemplary device of FIG. 3B, pressure sensors generate the specific pressure data profile that is further processed and may be converted to an output signal to a companion device. As noted above, because the individual physiology and selected motion of a user are unique to that individual, unique pressure sensor data can be used to generate the pressure data profile that is unique to the motions or gestures of an individual. Accordingly, in practice, the same person making the same "okay" sign will yield an identifiably different pressure data profile from a different person. These differences can be used to identify an individual for security purposes and activate unique identifier such as sign-ins, passwords, locks, and any other mechanism where individual identification is desired. Importantly, in contrast to traditional input devices such as a keyboard or mouse, the gesture is detected solely from the sensor array affixed to the appendage of the user and so no physical contact is necessary between the user and the input device. When integrated into a watch, individual gesture may also operate any function of the watch including instructions to send or receive messages, place or receive telephone calls, actuate electronic devices and user interfaces, and by making simple gestures, generate output signals to control a wide variety of electronic devices based on individualized pressure data profiles that are unique to a user.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A device for detecting motion by a user comprising:
a pressure sensor array comprising a plurality of individual flexible ionic pressure sensors spaced around and integrated into a support band having a tension element for keeping the sensors in contact with skin around an appendage of the user,
wherein the plurality of sensors are spaced around the band to detect pressure changes resulting from motion of the user and wherein each of the plurality of sensors conforms to an external curved surface of the body of the user; and
a pressure data profile resulting from motion of the user detected by the ionic flexible pressure sensor array, wherein the pressure data profile comprises a plurality of differential skin pressure measurements detected from motion of at least 6 different tendons of the user and identifies a gesture.

2. The device of claim 1, wherein the pressure array is comprised of at least six individual flexible ionic pressure sensors disposed on the inner surface of a band sized to circumferentially surround a human wrist.

3. The device of claim 1, further comprising a data storage unit containing the pressure data profile from the user and comprising an output command based on changes in pressure data profile correlated with the gesture by the user.

4. The device of claim 1, wherein at least ten individual flexible ionic pressure sensors are spaced around the band in an orientation corresponding to the location of the at least six separate tendons in a human wrist.

5. The device of claim 3, wherein the pressure data profile comprises ionic pressure sensor array data correlated to motion of the arm and fingers of the user.

6. The device of claim 1, wherein the pressure data profile is comprised of pressure measurements having a sensitivity of less than 1 mmHg.

7. The device of claim 1, further comprising a separate selected from the group consisting of an optical sensor, a gyroscope, a magnetometer, and an accelerometer, and combinations thereof, wherein the pressure data profile is further comprised of data from the separate sensor and combinations thereof.

8. The device of claim 1, wherein the individual flexible ionic pressure sensors of the array each have a height less than 1.5 mm.

9. The device of claim 1, further comprising a companion device selected from the group consisting of a digital watch, a digital telephone, a computer, a video game controller, a digital lock mechanism and combinations thereof.

10. A method to translate an identified gesture of a user into a control signal for a companion device comprising:
generating a pressure data profile input resulting from the identified gesture of the user that is detected by a pressure sensor array comprising a plurality of individual flexible ionic pressure sensors conforming to an external curved surface of a body and detecting differential skin pressure measurements from at least six different tendons of the user, correlating the pressure data profile input from the identified gesture into an output signal; transmitting the output signal to the companion device to cause the companion device to perform a function correlated with the identified gesture of the user.

11. The method of claim 10, wherein the step of generating the pressure data profile is comprised of measuring of at least six individual pressure sensor values from the flexible ionic pressure sensors circumferentially disposed around, and in contact with, the skin of a human wrist.

12. The method of claim 10, wherein the correlating step is comprised of comparing the pressure data profile input with a stored pressure data profile unique to the user and comparing the stored pressure data profile to the identified gesture of the user.

13. The method of claim 10, wherein the step of comparing the input pressure data profile and the stored pressure data profile is comprised of comparing pressure changes attributed to motion of the fingers and tendons of the user at a first time with pressure changes attributed to motion of the fingers and tendons of the user at a second time.

14. The method of claim 10, wherein the input pressure data profile is comprised of a pressure measurement from the skin of the user proximate to the at least 6 individual tendons from at least 10 flexible ionic pressure sensors integrated into spaced around a band held in conforming engagement with the wrist of the user.

15. The method of claim 10, wherein the input pressure data profile has a sensitivity of less than 1 mmHg.

16. The method of claim 10, wherein the input pressure data profile is further comprised of input from a separate sensor selected from the group consisting of an optical sensor, a gyroscope, a magnetometer, and an accelerometer, and combinations thereof.

17. The method of claim 10, wherein the step of generating an output signal to control the companion device is comprised of a data component that identifies the individual user as against other users such that the companion device will not operate without the data component of the individual user.

* * * * *